(12) United States Patent
Borg

(10) Patent No.: US 11,813,130 B1
(45) Date of Patent: Nov. 14, 2023

(54) DENTAL HYGIENE SYSTEM

(71) Applicant: N. Michelle Borg, Lincoln, CA (US)

(72) Inventor: N. Michelle Borg, Lincoln, CA (US)

( * ) Notice: Subject to any disclaimer, the term of this patent is extended or adjusted under 35 U.S.C. 154(b) by 612 days.

(21) Appl. No.: 16/231,806

(22) Filed: Dec. 24, 2018

Related U.S. Application Data

(60) Provisional application No. 62/610,260, filed on Dec. 25, 2017.

(51) Int. Cl.
*A61C 15/04* (2006.01)

(52) U.S. Cl.
CPC .................. *A61C 15/046* (2013.01); *A61C 15/041* (2013.01)

(58) Field of Classification Search
CPC ............................ A61C 15/046; A61C 15/041
See application file for complete search history.

(56) References Cited

U.S. PATENT DOCUMENTS

| | | | | |
|---|---|---|---|---|
| 3,592,203 A * | 7/1971 | Johnson | A61C 15/046 132/323 |
| 3,734,107 A * | 5/1973 | Thierman | A61C 15/046 132/325 |
| 3,927,687 A * | 12/1975 | Thierman | B65H 75/28 132/325 |
| 4,214,598 A * | 7/1980 | Lee | A61C 15/046 132/325 |
| 4,574,823 A * | 3/1986 | Uriss | A61C 15/046 132/325 |
| 4,660,584 A * | 4/1987 | Wofford | A61C 15/046 132/325 |
| 4,883,080 A * | 11/1989 | Lang | A61C 15/046 132/322 |
| 5,052,420 A * | 10/1991 | Chen | A61C 15/046 132/325 |
| 5,183,065 A * | 2/1993 | Mason | A61C 15/046 132/324 |
| 5,269,331 A * | 12/1993 | Tanriverdi | A61C 15/046 132/325 |
| 5,450,866 A * | 9/1995 | Wang et al. | A61C 15/046 132/324 |
| 5,613,508 A * | 3/1997 | Bushman | A61C 15/046 132/325 |
| 9,517,118 B1* | 12/2016 | Borg et al. | B65H 69/04 |
| 2002/0078974 A1* | 6/2002 | Kossak et al. | A61C 15/046 132/325 |
| 2005/0263169 A1* | 12/2005 | Romine | A61C 15/043 132/321 |
| 2007/0204879 A1* | 9/2007 | Chen et al. | A61C 15/046 132/325 |
| 2011/0284023 A1* | 11/2011 | Borg et al. | A61C 15/043 132/325 |
| 2016/0199163 A1* | 7/2016 | Kabrin | A61C 15/046 433/216 |
| 2016/0310246 A1* | 10/2016 | Borg | A61C 15/046 |

* cited by examiner

*Primary Examiner* — Nicholas D Lucchesi
(74) *Attorney, Agent, or Firm* — Peter Jensen-Haxel

(57) ABSTRACT

A flosser is described that has only moving four parts, floss, a single piece body, a piece source spool and a single piece take-up spool. The source spool and take-up spool may snap into a source cavity and a take-up cavity, respectively. The source and take-up spools may be rotatably secured in the respective cavities using detent rings and snap rings. A cantilever flexure assembly is integrated into the single piece body and includes a push button assembly and a ratchet flexure. The push button assembly controls rotation of the source spool for dispensing and tensioning floss. The ratchet flexure controls rotation of the take-up spool for collecting and tensioning floss.

14 Claims, 4 Drawing Sheets

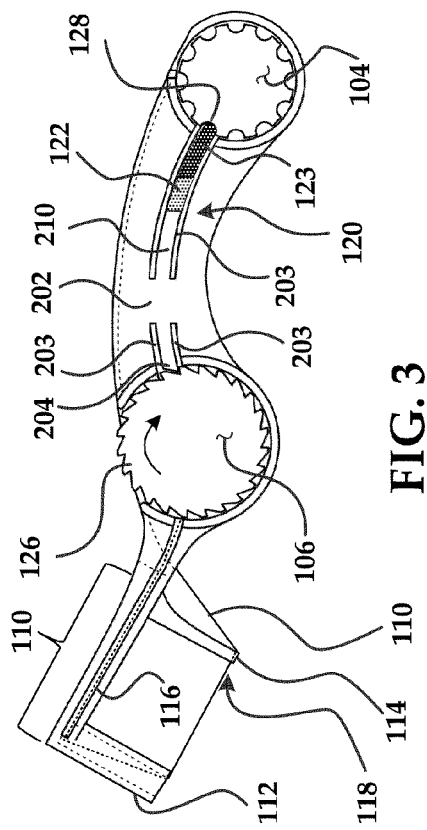
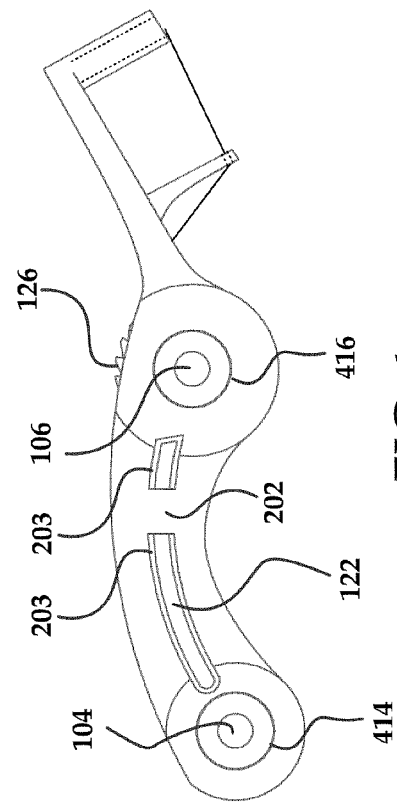
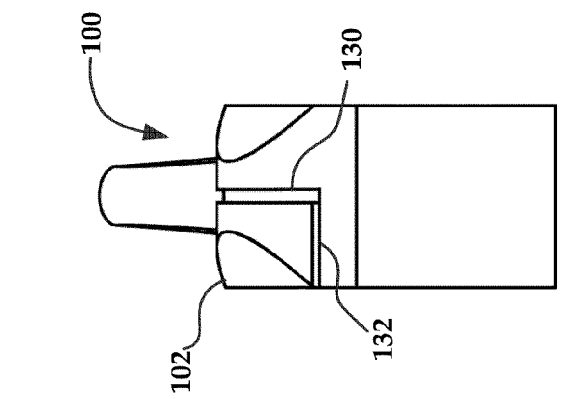
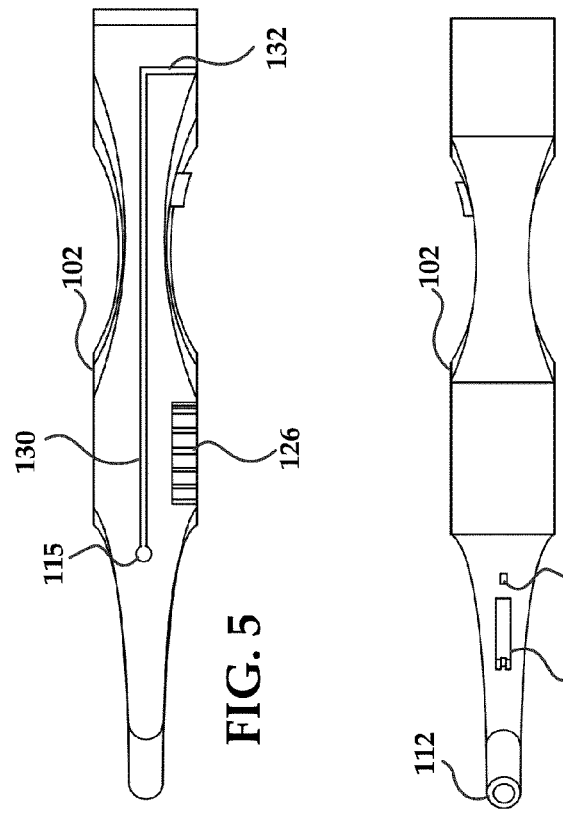
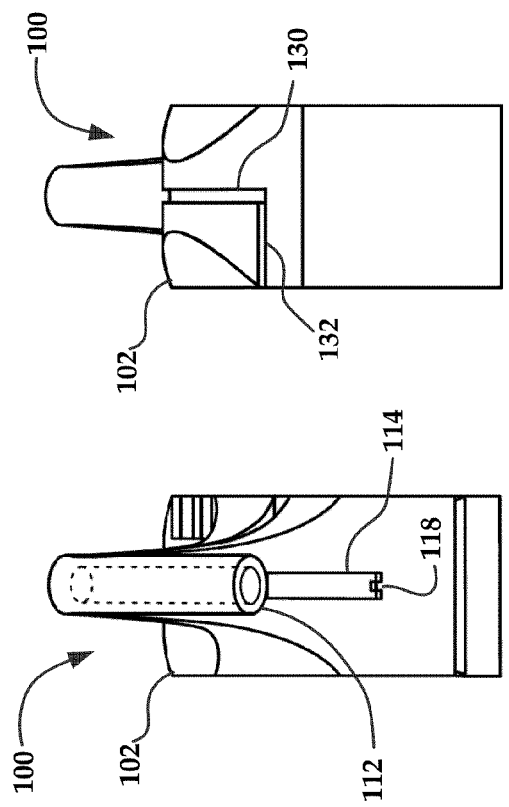

DENTAL HYGIENE SYSTEM

CROSS REFERENCE TO RELATED APPLICATIONS

The present application claims priority and benefit to U.S. Provisional Pat. Application Serial No. 62/610,260 filed on Dec. 25, 2017 and titled "DENTAL HYGIENE SYSTEM," which is incorporated by reference herein in its entirety.

BACKGROUND

Field of the Application

The present application relates generally to a flossing apparatus, and more particularly to an orthodontic flosser.

Description of Related Art

Flossing is particularly important for maintaining oral hygiene. Unfortunately, threading, inserting, manipulating the floss around teeth can be difficult for some. Maintaining tension on the floss while manipulating the floss between teeth involves a degree of dexterity and skill that is often beyond the ability of many children and some adults with limited strength or dexterity. Frustration due to the difficulty of acquiring skills and manipulating the floss can discourage flossing. A solution is disposable devices that have a short stretch of preloaded floss secured to a plastic handle. Unfortunately, these can only be used once and generate waste and litter. Mechanical flossers can dispense and collect floss for multiple uses. Unfortunately, these are generally designed using many moving parts, which results in materials, labor, and other manufacturing costs that price such devices out of the market.

SUMMARY

A flosser is described that has only moving four parts, floss, a single piece body, a single piece source spool, and a single piece take-up spool. The parts can be snapped together without screws or other types of fasteners. The source spool snaps into a source cavity in the body using detent rings in the cavity and snap rings in the spool. The take-up spool snaps into a take-up cavity in the body, also using detent rings in the cavity and snap rings in the spool. A cantilever flexure assembly is integrated into the single piece body and includes a push button assembly and a ratchet flexure. The push button assembly is contiguous with a node of the body and controls rotation of the source spool for dispensing and tensioning floss. The ratchet flexure is also contiguous with the node and controls rotation of the take-up spool for collecting and tensioning floss.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG. 3 is a front elevation of the flosser of FIG. 1.

FIG. 4 is a rear elevation view of the flosser of FIG. 1.

FIG. 5 is a top view of the flosser of FIG. 1.

FIG. 6 is a bottom view of the flosser of FIG. 1.

FIG. 7 is a left side view of the flosser of FIG. 1 from the head side.

FIG. 8 is a right side view of the flosser of FIG. 1 from the source spool side.

DETAILED DESCRIPTION

Figure 1:
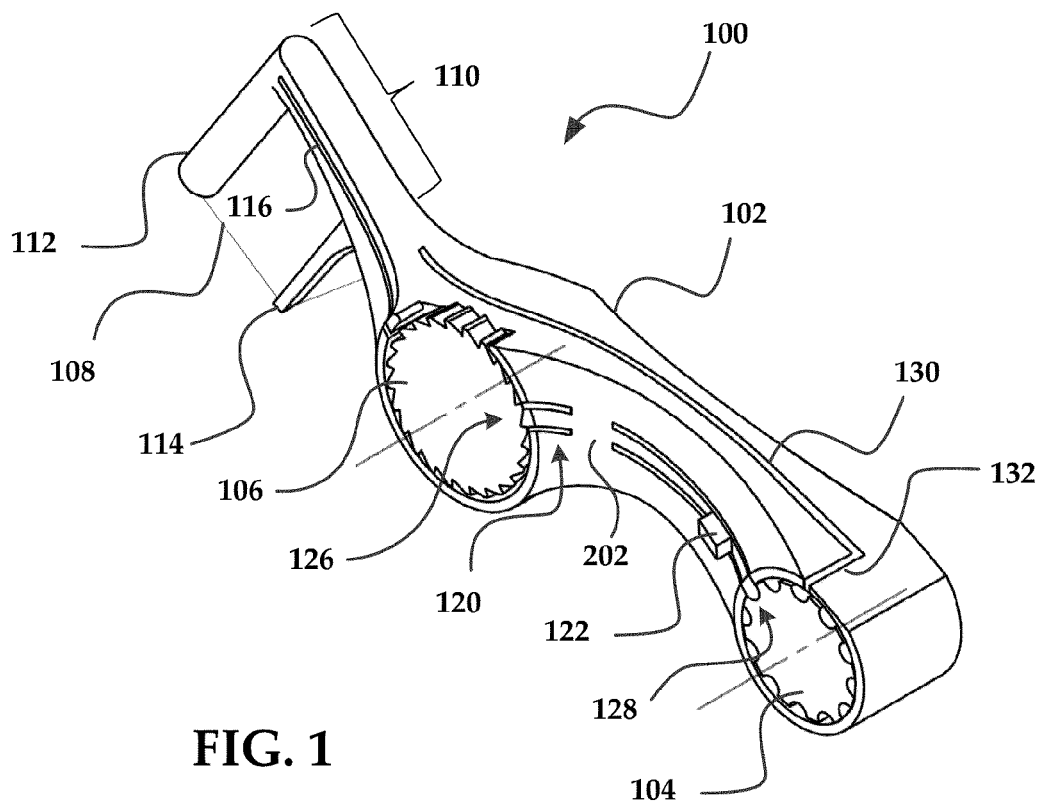
FIG. 1 is a front perspective view of an embodiment of a flosser, in accordance with aspects of the technology.
Figure 2:
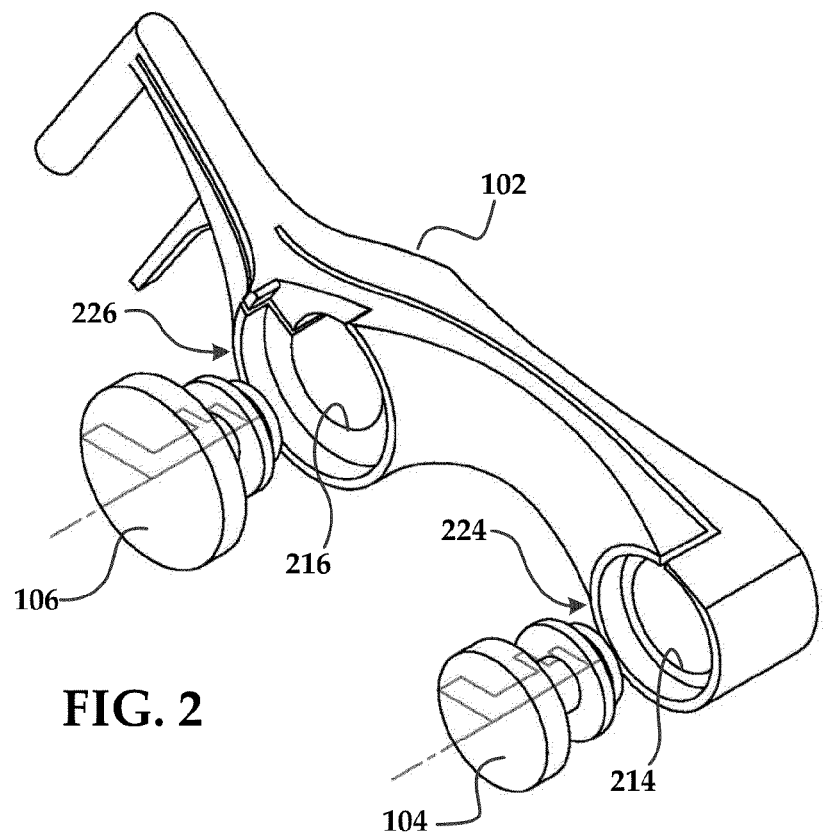
FIG. 2 is an exploded perspective view illustrating exemplary internal components the flosser of FIG. 1, in accordance with aspects of the technology.

FIG. 1 is a front perspective view of an embodiment of a flosser 100, in accordance with aspects of the technology. FIG. 2 is an exploded perspective view illustrating exemplary internal components the flosser 100 of FIG. 1, in accordance with aspects of the technology. FIG. 3 is a front elevation of the flosser 100 of FIG. 1. FIG. 4 is a rear elevation of the flosser 100 of FIG. 1. The flosser 100 of FIG. 1 includes a single piece body 102, a single piece source spool assembly 104, single piece take-up spool assembly 106, and floss 108. The single piece source spool assembly 104 and single piece take-up spool assembly 106 are disposed in cavities illustrated in FIG. 2 of the single piece body 102.

The body 102 may be fabricated as a single piece that includes a handle portion 111 and a head 110 (See FIG. 9). The handle portion 111 of the single piece body 102 includes a feed channel 130, a source groove 132, a cantilevered flexure assembly 120, a source cavity 224, and a take-up cavity 226. The feed channel 130 may be continuous with the source groove 132. Note, the ratchet teeth 126 of the single piece take-up spool assembly 106 in FIG. 2 have been omitted for simplicity. Also, the cogs and inter cog spaces 128 of the single piece source spool assembly 104 in FIG. 2 have been omitted for simplicity.

Referring to FIG. 1, and FIG. 3, the head 110 portion of the single piece body 102 includes a floss tube 112, a prong 114, and a take-up channel 116. The prong includes an aperture 118. The floss tube 112 may be in communication with the take-up channel 116.

The single piece body 102 may be machined from a single piece of material using computer aided manufacturing (CAM) such as CAD/CAM or CNC machines. The single piece body 102 may be fabricated as a single piece of material using molding technologies, such as injection molding, blow molding, casting, sintering, compression molding, and/or the like. In various embodiments, the single piece body 102 may be fabricated into a single piece of material using 3D printing technologies, additive manufacturing techniques, fused deposition, thermoplastic, fused particle fabrication, fused granular fabrication, selective laser melt, e-beam melt, photo-polymerization, mask image projection, and/or the like.

Referring to FIG. 3 and FIG. 4, the cantilever flexure assembly 120 includes a ratchet flexure 204, a source button assembly 122. The ratchet flexure 204 of FIG. 3 is integrally attached to the single body 102 at a node 202. An end of the ratchet flexure 204 engages the ratchet teeth 126 of the single piece take-up spool assembly 106 to constrain rotation of the take-up spool 106 in one direction (e.g., clockwise as illustrated in FIG. 3). The ratchet flexure 204 may be bounded on two sides by upper and lower flexure grooves 203. The lower flexure groove 203 may be sized to allow flex of the flexure 204 in the plane of the ratchet teeth 126 and allow clockwise rotation of the take-up spool 106. The upper flexure groove 203 may be sized to limit flex of the ratchet flexure 204 to oppose counter clockwise rotation of the take-up spool 106. Thus, the take-up spool 106 may be constrained to rotate in one direction.

The source button assembly 122 of FIG. 3 is also integrally attached to the single body 102 at the node 202, distal the ratchet flexure 204. A button extension 123 of the source button assembly 122 may engage an inter cog space 128 of the single piece source spool assembly 104. Pressing the source button assembly 122 is may move the button extension 123 in the direction of the axis of the source spool 104 (see also FIGS. 9B and 9C), which moves the button extension 123 out of engagement with the inter cog space 128. When the button extension is out of position, the source spool 104 may be free to rotate and feed floss 108 from the source spool 104 when the source button assembly 122 is pressed. When the source button assembly 122 is released, the button extension 123 of the source button assembly 122 is engages the inter cog space 128 to prevent rotation of the source spool 104. While the source spool 104 is prevented from rotating by the source button assembly 122, rotating the take-up spool assembly may apply tension to floss 108 suspended between the tube 112 and the prong 114.

FIG. 5 is a top view of the flosser 100 of FIG. 1. FIG. 6 is a bottom view of the flosser 100 of FIG. 1. FIG. 5 illustrates teeth of the take-up spool that may be rotated by a thumb or finger while gripping the flosser body 102. FIG. 5 also illustrates the source groove 132 and feed channel 130. The end of the feed channel 130 may terminate proximate the head at a floss aperture 115. The floss aperture 115 is also illustrated in FIG. 6.

FIG. 7 is a left side view of the flosser 100 of FIG. 1 from the head 110 side. FIG. 8 is a right side view of the flosser 100 of FIG. 1 from the single piece source spool assembly 104 side. The prong includes an aperture 118 of FIG. 6 and FIG. 7 is illustrated as a groove. However, in some embodiments, the prong aperture 118 is an aperture.

Figure 9A:
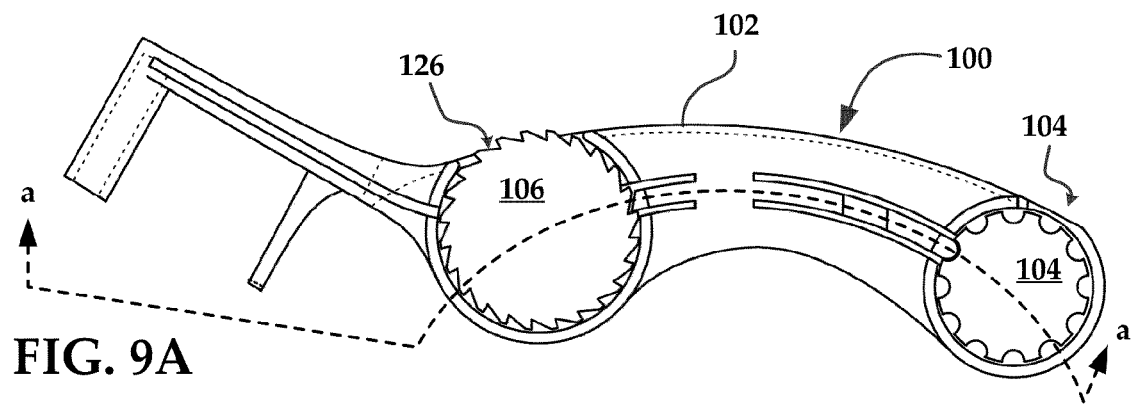
FIG. 9A is a repetition of FIG. 3 (omitting most of the reference numbers of FIG. 3) to illustrate a location of a cross sections of FIG. 9B and FIG. 9C taken along line a-a.
Figure 9B:
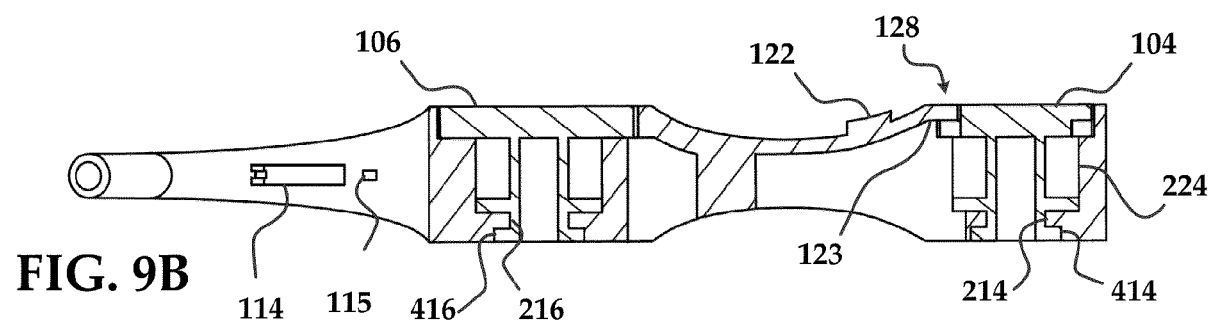
FIG. 9B illustrates a cross section of the body taken along line a-a of FIG. 9A, the button assembly released and in an engagement position.
Figure 9C:
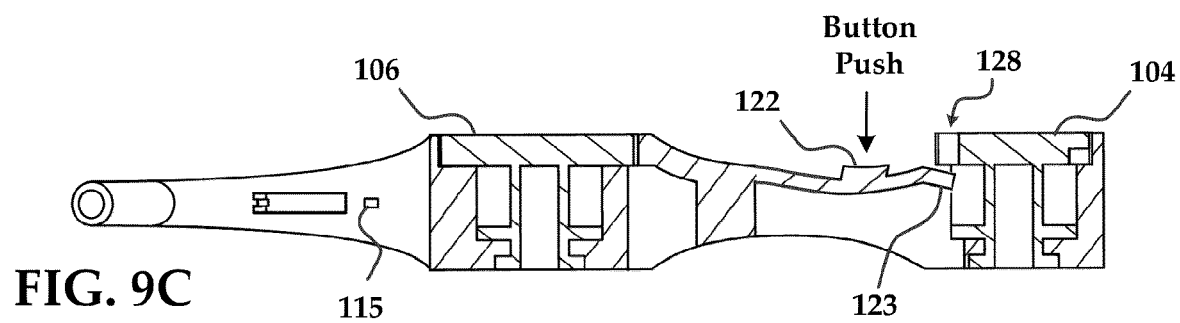
FIG. 9C illustrates a cross section of the body taken along line a-a of FIG. 9A, the button assembly pushed to a release position.

FIG. 9A is a repetition of FIG. 3 (omitting most of the reference numbers of FIG. 3) to illustrate a location of a cross sections of FIG. 9B and FIG. 9C taken along line a-a. In FIG. 9A a portion of the cross section (between the axis of the single piece source spool assembly 104 and the axis single piece take-up spool assembly 106) is shown as generally following an arc through the center of the cantilever flexure and extending beyond the source and take-up spools.

FIG. 9B illustrates a cross section of the body 102 taken along line a-a of FIG. 9A, the button assembly 122 released and in an engagement position. FIG. 9B also shows the floss aperture 115 in the head 110 and a cross section of the single piece source spool assembly 104 and single piece take-up spool assembly 106. The cross section of the single piece source spool assembly 104 illustrates a source cavity detent ring 214 engaged with a source snap ring 414 and a take-up cavity detent ring 216 engaged with the take-up snap ring 416.

Referring to FIG. 2, FIG. 4, and FIG. 9B the single piece source spool assembly 104 and take-up spool may be secured in the flosser single piece body 102 by an engagement with the detent ring 214 and detent ring 216, respectively. The single piece source spool assembly 104 may be inserted into the source cavity 224. In some embodiments, the single piece source spool assembly 104 includes a snap ring 414 (also illustrated in FIG. 9) that engages the source cavity detent ring 214. The source cavity detent ring 214) may be configured to flexibly capture the source spool snap ring 414 and hold the source spool 104 within the source cavity 224 while allowing the source spool 104 to rotate freely within the source cavity 224.

Similarly, the single piece take-up spool assembly 106 may be inserted into the take-up cavity 226. In some embodiments, the take-up spool ring 106 includes a snap ring 416 (also illustrated in FIG. 9) that engages the take-up cavity detent ring 216. The take-up cavity detent ring 216 may be configured to flexibly capture the take-up spool snap ring 416 and hold the single piece take-up spool assembly 106 within the take-up cavity 226 while allowing the take-up spool 106 to rotate freely within the take-up cavity 226.

The single piece source spool assembly 104, single piece take-up spool assembly 106, and/or single piece body 102 may be fabricated using a flexible plastic. Upon inserting the source spool 104 into the source spool cavity 224, the source snap ring 414 and/or source cavity detent ring 214 may flex sufficiently for the source snap ring 414 to be pushed passed the source cavity detent ring 214 and into the engagement position. Similarly upon inserting the take-up spool 106 into the take-up spool cavity 226, the take-up snap ring 416 and/or take-up cavity detent ring 216 may flex sufficiently for the take-up snap ring 416 to be pushed passed the take-up cavity detent ring 216 and into the engagement position.

In FIG. 9B, the source button assembly 122 is illustrated in the released position and the button extension 123 engages the cogs 128 to prevent the source spool 104 from rotating.

FIG. 9C illustrates a cross section of the body 102 taken along line a-a of FIG. 9A, the button assembly 122 pushed to a release position. In FIG. 9C, the button 122 is illustrated in the pressed position and the button extension 123 does not engage the cogs 128 to prevent the source spool 104 from rotating.

Figure 10:
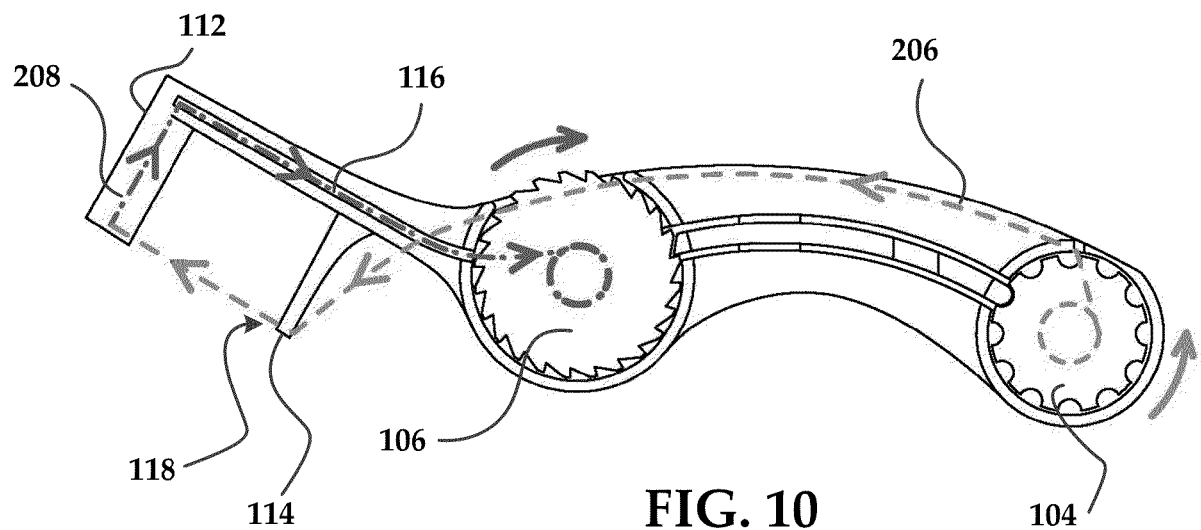
FIG. 10 illustrates a path of the floss that includes fresh floss and used floss.

FIG. 10 illustrates a path of the floss 108 that includes fresh floss 206 and used floss 208. Rotating the take-up spool while pressing the source button assembly 122 may advance the floss 108 along the path. Rotating the take-up spool 106 while the button assembly is released may apply tension to floss 108 suspended between the tube 112 and the prong 114. Referring to FIG. 1, FIG. 3, and FIG. 10, fresh floss 206 may be routed along a path from the single piece source spool assembly 104 through the source groove 132, and along the source feed channel 130 to the floss aperture 115. The floss aperture admits fresh floss 206 from the top side of the head 110 to the bottom side of the head 110. The fresh floss 206 may be routed from the floss aperture 115 to the floss prong 114. At the prong 114, the fresh floss 206 may be threaded through the prong aperture 118 and suspended under tension between the prong 112 and the floss tube 112.

The suspended floss 108 may be used for cleaning between teeth at which time the suspended floss becomes used floss 208. The used floss 208 may be threaded through the floss tube 112 and routed along the take-up channel 116 to the single piece take-up spool assembly 106.

The body 102 may be fabricated as a single piece structure from a single piece of flexible material (e.g., plastic). Examples of single piece fabrication of a single piece structure includes machining a single piece of material, molding (e.g., injection molding), and 3D printing a single piece the such that a every component of the single piece structure is contiguous with the structure, and none of the components of the single piece structure functions normally after being completely separated from the structure. Moreover, a single piece structure does not function normally after any the components of the single piece structure has been separated or removed from the single piece structure.

For example, the source button assembly 122 of the single piece body 102 would not function normally if it were completely separated or removed from the single piece body 102. Similarly, the cantilevered flexure assembly 120 of the single piece body 102 would not function normally if it were completely separated or removed from the single piece body 102. Conversely, the single piece body 102 would not function normally if either the source button assembly 122 or the cantilevered flexure assembly 120 were separated or removed from the single piece body 102.

Figure 11:
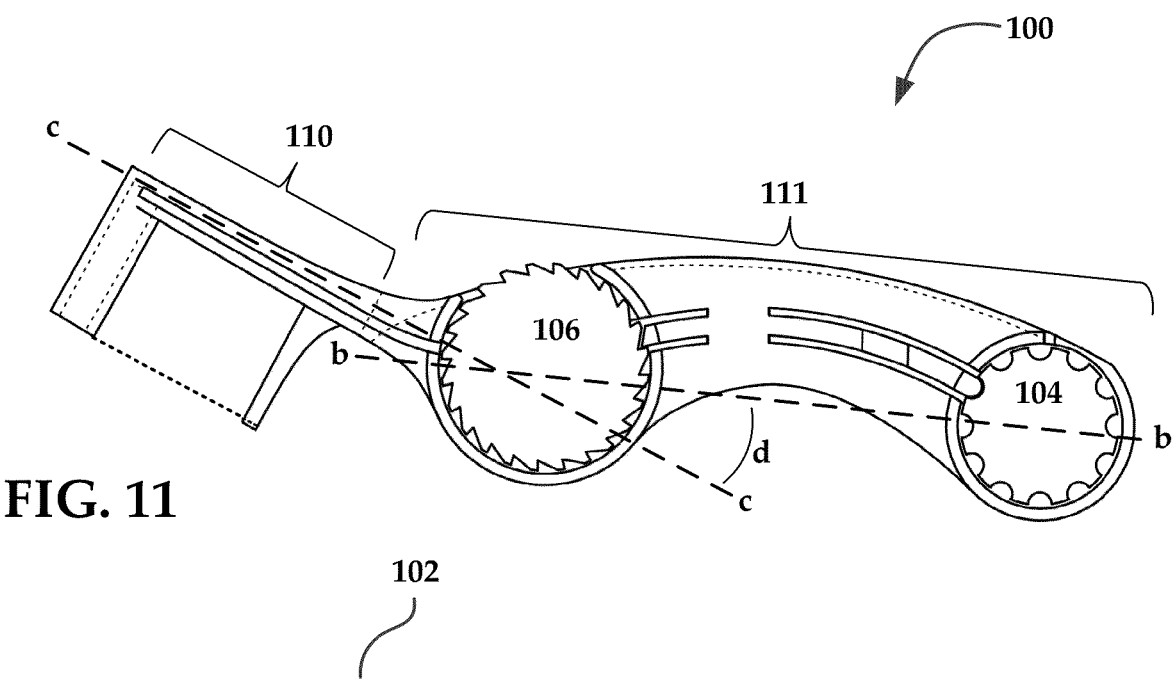
FIG. 11 illustrates an angle between a head and a handle of the flosser of FIG. 1

FIG. 11 illustrates an angle between the head 110 and a handle 111 of the flosser 100. The flosser body 102 may be considered as including a head 110 and a handle 111. An axis of the handle 111 may be defined as a line through the center of the source spool 104 and the take-up spool 106, represented by dashed line b-b. An axis of the head may be defined as a line about parallel to the suspended floss 108 illustrated as dashed line c-c. An angle "d" between line b-b and c-c illustrated in FIG. 11 is about 22 degrees. In various embodiments, angle d is between about 15-25 degrees. The angle between the head and the head 110 and the handle 111 may serve to improve ergonomics of the flosser 100, rendering it easier to floss using the flosser 102.

The embodiments discussed herein are illustrative. As these embodiments are described with reference to illustrations, various modifications or adaptations of the methods and/or specific structures described may become apparent to persons of ordinary skill in the art. Various features and aspects of the above described technology may be used individually or jointly. Features in each of the various illustrations may be combined with features in other illustrations or used individually for illustrating the present technology. All such modifications, adaptations, or variations that rely upon the teachings of the embodiments, and through which these teachings have advanced the art, are considered to be within the spirit and scope of the present application. Hence, these descriptions and drawings should not be considered in a limiting sense, as it is understood that the present application is in no way limited to only the embodiments illustrated.

I claim:

1. A flosser consisting of:
   floss;
   a single piece source spool assembly that dispenses fresh floss:
   a single piece take-up spool assembly that collects used floss; and
   a single piece body comprising:
      a head including a first and second floss support that suspend floss therebetween;
      a source cavity that supports the single piece source spool assembly for rotation about an axis normal to the single piece body to dispense fresh floss;
      a take-up cavity that supports the single piece take-up spool assembly for rotation about an axis normal to the single piece body to collect used floss; and
      a cantilever flexure assembly including:
         a source button assembly cantilevered from the single piece body, the source button assembly configured to flex to permit rotation of the single piece source spool when pressed, and prevent rotation of the source spool when released, and
         a ratchet flexure also cantilevered from the single piece body, the ratchet flexure configured to flex in a plane of rotation for constraining rotation of the single piece take-up spool assembly in one direction.

2. The flosser of claim 1, wherein the first floss support is a prong that feeds fresh floss into suspension, and the second floss support is a tube that conducts used floss from suspension in a path to the single piece take-up spool assembly.

3. The flosser of claim 1, wherein at least one of the single piece source spool assembly, the single piece take-up spool assembly, and the single piece body are injection molded.

4. The flosser of claim 1, wherein the button assembly is configured to flex in a direction along the axis of the single piece source spool assembly, and when pressed, move an extension of the button assembly from a position between two source spool cogs to a position for not engaging the two source spool cogs, whereby the single piece source spool assembly is released to rotate freely within the source cavity of the single piece body.

5. The flosser of claim 1, wherein the source cavity includes a detent ring for capturing the single piece source spool assembly to retain the single piece source spool assembly within the source cavity during rotation.

6. The flosser of claim 5, wherein the single piece source spool assembly includes a snap ring for engaging the detent ring of the source cavity.

7. The flosser of claim 1, wherein the take-up cavity includes a detent ring for capturing the single piece take-up spool assembly and retaining the single piece take-up spool assembly within the take-up cavity during rotation.

8. The flosser of claim 1, wherein the single piece take-up spool assembly includes a snap ring for engaging a detent ring of the take-up cavity.

9. The flosser of claim 1, wherein the single piece take-up spool assembly includes ratchet teeth that engage the ratchet flexure for constraining rotation of the single piece take-up spool assembly in one direction.

10. The flosser of claim 1, wherein the single piece source spool assembly includes cogs that engage an extension of the source button assembly.

11. A method for fabricating a flosser, the method comprising:
    fabricating a single piece source spool assembly;
    fabricating a single piece take-up spool assembly; and
    fabricating a single piece body that comprises:
       fabricating in the single piece body a source cavity for supporting the single piece source spool assembly for rotation to dispense fresh floss;
       fabricating in the single piece body a take-up cavity for supporting the single piece take-up spool assembly for rotation to collect used floss; and
       fabricating in the single piece body a cantilever flexure assembly including a button assembly for controlling rotation of the single piece source spool assembly and a ratchet flexure for controlling rotation of the single piece take-up assembly.

12. The method of claim 11, further comprising
    fabricating in the source cavity of the single piece body a source detent ring; and
    fabricating in the single piece source spool assembly a snap ring for engaging the source detent ring to retain the single piece source spool assembly within the source cavity.

13. The method of claim 11, further comprising
fabricating in the source cavity of the single piece body a detent ring; and
fabricating in the single piece take-up spool assembly a snap ring for engaging the detent ring to retain the single piece take-up assembly within the take-up cavity.

14. The method of claim 11, wherein the button assembly prevents the single piece source spool assembly from rotating while the button assembly is released and allows the single piece source spool assembly to rotate while the button assembly is pressed.

* * * * *